(12) United States Patent
Sprague et al.

(10) Patent No.: US 8,670,174 B2
(45) Date of Patent: Mar. 11, 2014

(54) ELECTROPHORETIC DISPLAY FLUID

(75) Inventors: Robert A. Sprague, Saratoga, CA (US); Xiaojia Wang, Fremont, CA (US)

(73) Assignee: SiPix Imaging, Inc., Fremont, CA (US)

( * ) Notice: Subject to any disclaimer, the term of this patent is extended or adjusted under 35 U.S.C. 154(b) by 180 days.

(21) Appl. No.: 13/300,178

(22) Filed: Nov. 18, 2011

(65) Prior Publication Data

US 2012/0134010 A1 May 31, 2012

Related U.S. Application Data

(60) Provisional application No. 61/418,350, filed on Nov. 30, 2010.

(51) Int. Cl.
*G02B 26/00* (2006.01)
*G09G 3/34* (2006.01)

(52) U.S. Cl.
USPC .......................................... 359/296; 345/107

(58) Field of Classification Search
CPC ............ G02F 1/167; G02F 2001/1676; G02F 2001/1678; G02F 2203/34
USPC ............ 252/500, 582, 586; 345/107; 359/296
See application file for complete search history.

(56) References Cited

U.S. PATENT DOCUMENTS

| | | |
|---|---|---|
| 3,892,568 A | 7/1975 | Ota |
| 4,298,448 A | 11/1981 | Muller et al. |
| 5,378,574 A | 1/1995 | Winnik et al. |
| 5,980,719 A | 11/1999 | Cherukuri et al. |
| 6,198,809 B1 | 3/2001 | Disanto et al. |
| 6,337,761 B1 | 1/2002 | Rogers et al. |
| 6,373,461 B1 | 4/2002 | Hasegawa et al. |
| 6,486,866 B1 | 11/2002 | Kuwahara et al. |
| 6,538,801 B2 | 3/2003 | Jacobson et al. |
| 6,693,620 B1 | 2/2004 | Herb et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,864,875 B2 | 3/2005 | Drzaic et al. |
| 7,009,756 B2 | 3/2006 | Kishi et al. |
| 7,038,655 B2 | 5/2006 | Herb et al. |
| 7,038,670 B2 | 5/2006 | Liang et al. |
| 7,046,228 B2 | 5/2006 | Liang et al. |
| 7,050,218 B2 | 5/2006 | Kanbe |
| 7,075,502 B1 | 7/2006 | Drzaic et al. |
| 7,283,199 B2 | 10/2007 | Aichi et al. |

(Continued)

FOREIGN PATENT DOCUMENTS

EP   1 089 118   4/2001
WO   WO 99/53373   10/1999

(Continued)

OTHER PUBLICATIONS

U.S. Appl. No. 13/115,899, filed May 25, 2011, Lin.

(Continued)

*Primary Examiner* — David N Spector
(74) *Attorney, Agent, or Firm* — Perkins Coie LLP

(57) ABSTRACT

This invention relates to an electrophoretic display fluid comprising a non-mobile or semi-mobile phase and two types of charged pigment particles dispersed in a solvent or solvent mixture, and an electrophoretic display device utilizing such an electrophoretic display fluid. The electrophoretic fluid of the present invention provides improved image qualities.

16 Claims, 7 Drawing Sheets

(56) References Cited

U.S. PATENT DOCUMENTS

| | | |
|---|---|---|
| 7,365,732 B2 | 4/2008 | Matsuda et al. |
| 7,417,787 B2 | 8/2008 | Chopra et al. |
| 7,545,557 B2 | 6/2009 | Iftime et al. |
| 7,548,291 B2 | 6/2009 | Lee et al. |
| 7,982,941 B2 | 7/2011 | Lin et al. |
| 8,072,675 B2 | 12/2011 | Lin et al. |
| 2002/0033792 A1 | 3/2002 | Inoue |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0263947 A1 | 12/2004 | Drzaic et al. |
| 2005/0151709 A1 | 7/2005 | Jacobson et al. |
| 2005/0190431 A1 | 9/2005 | Matsuda |
| 2006/0202949 A1* | 9/2006 | Danner et al. ............... 345/107 |
| 2009/0034054 A1 | 2/2009 | Ikegami et al. |
| 2009/0213452 A1 | 8/2009 | Lin et al. |
| 2009/0251763 A1 | 10/2009 | Sprague et al. |
| 2010/0165005 A1 | 7/2010 | Sprague |
| 2010/0165448 A1 | 7/2010 | Sprague |
| 2010/0225228 A1* | 9/2010 | Yamamoto et al. ........... 313/504 |
| 2011/0217639 A1* | 9/2011 | Sprague ......................... 430/32 |
| 2011/0261433 A1 | 10/2011 | Sprague et al. |
| 2012/0200910 A1* | 8/2012 | Hayashi ........................ 359/296 |

FOREIGN PATENT DOCUMENTS

| | | |
|---|---|---|
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/225,184, filed Sep. 2, 2011, Wang et al.

* cited by examiner

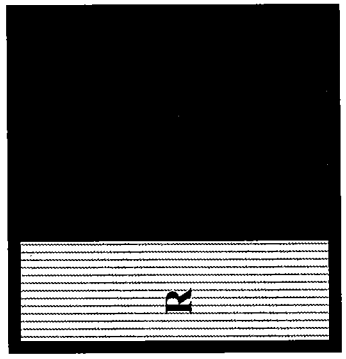
Figure 3c
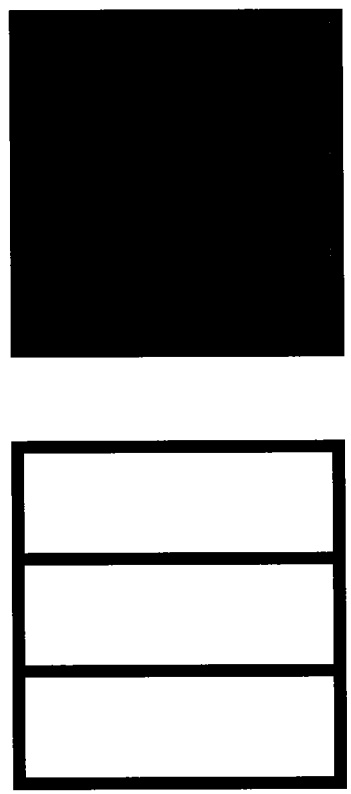
Figure 3b
Figure 3a
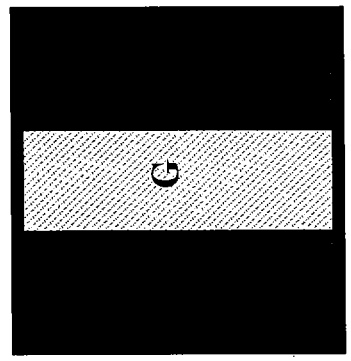
Figure 3e
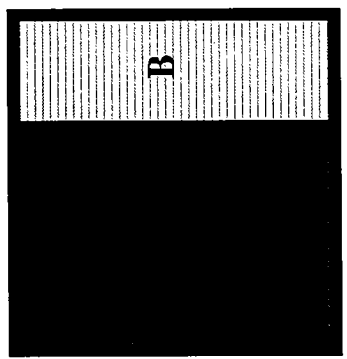
Figure 3d

ELECTROPHORETIC DISPLAY FLUID

This application claims priority to U.S. Provisional Application No. 61/418,350, filed Nov. 30, 2010; the content of which is incorporated herein by reference in its entirety.

FIELD OF THE INVENTION

This invention relates to an electrophoretic display fluid comprising a non-mobile or semi-mobile phase and two types of charged pigment particles dispersed in a solvent or a solvent mixture, and an electrophoretic display device utilizing such a display fluid.

BACKGROUND OF THE INVENTION

The electrophoretic display (EPD) is a non-emissive device based on the electrophoresis phenomenon influencing charged pigment particles suspended in a dielectric solvent. An EPD typically comprises a pair of opposed, spaced-apart plate-like electrodes. At least one of the electrodes, typically on the viewing side, is transparent. An electrophoretic fluid composed of a dielectric solvent and charged pigment particles dispersed therein is enclosed between the two electrode plates. When a voltage difference is imposed between the two electrode plates, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color.

Known techniques for an electrophoretic fluid either disperse one type of charged pigment particles in a solvent of a contrast color or disperse two types of charged pigment particles of contrast colors in a clear solvent. In the former case where white charged particles are dispersed in a dark colored solvent, the whiteness displayed by the display device is limited by absorption of light in the interstitial locations between the white charged particles and by the amount of white particles that can go into the fluid before they become too low in mobility, due to field shielding and high viscosity of the fluid. In the latter case where both black and white particles are dispersed in a clear solvent, the whiteness is also limited due to the number of white particles and how well they can be separated from the black particles.

SUMMARY OF THE INVENTION

The present invention is directed to an electrophoretic fluid which comprises a non-mobile or semi-mobile phase and two types of charged pigment particles dispersed in a solvent or solvent mixture.

More specifically, the invention is directed an electrophoretic display fluid comprising:
  (i) white non-mobile or semi-mobile phase,
  (ii) a first type of charged pigment particles which are black, and
  (iii) a second type of charged pigment particles which are colored transparent or opaque;
wherein said non-mobile or semi-mobile phase and the two types of the charged pigment particles are dispersed in a clear and colorless solvent or solvent mixture, and the two types of charged particles are oppositely charged.

In one embodiment, the non-mobile or semi-mobile phase is white non-mobile or semi-mobile pigment particles. In one embodiment, the size of the non-mobile or semi-mobile pigment particles is in the range of about 0.5 to about 3 microns. In one embodiment, the size of the two types of the charged particles is in the range of about 0.01 to about 1 micron.

In one embodiment, the concentration of the non-mobile or semi-mobile pigment particles is in the range of about 10% to about 40% of the fluid. In one embodiment, the concentration of each of the two types of the charged particles is in the range of about 1% to about 10% of the fluid.

In one embodiment, the non-mobile or semi-mobile phase is formed by dispersing droplets of a non-polar solvent in a polar solvent.

In one embodiment, the non-mobile or, semi-mobile phase is air bubbles.

In one embodiment, the non-mobile or semi-mobile phase is a polymeric porous matrix.

In one embodiment, the colored transparent or opaque pigment particles are red, green or blue.

In one embodiment, the second type of charged pigment particles is transparent colored particles.

In one embodiment, the transparent colored particles are formed from a pigment which has a refractive index closely matched to that of the solvent or solvent mixture.

In one embodiment, the transparent colored particles are polymeric beads stained with a dye.

In one embodiment, the transparent colored particles are polymeric beads with a dye dissolved therein.

In one embodiment, the polymeric beads are formed from polyethylene, polymethylmethacrylate (acrylic) or polystyrene.

In one embodiment, the invention is directed to a display device, comprising a plurality of display cells wherein each of said display cells
  a) is filled with an electrophoretic display fluid comprising a non-mobile or semi-mobile phase and two types of charged pigment particles dispersed in a solvent or solvent mixture; and
  b) is sandwiched between a common electrode and at least two pixel electrodes.

In one embodiment, the display cells are microcup-based. In one embodiment, the display cells are microcapsule-based.

In one embodiment, three display cells form a pixel wherein the three display cells are filled with the display fluid comprising red transparent or opaque, green transparent or opaque and blue transparent or opaque pigment particles, respectively.

The electrophoretic fluid of the present invention provides improved image qualities.

BRIEF DESCRIPTION OF THE DRAWINGS

FIGS. 3a-3e illustrates a full color display device utilizing the present invention.

DETAILED DESCRIPTION OF THE INVENTION

Figure 1A:
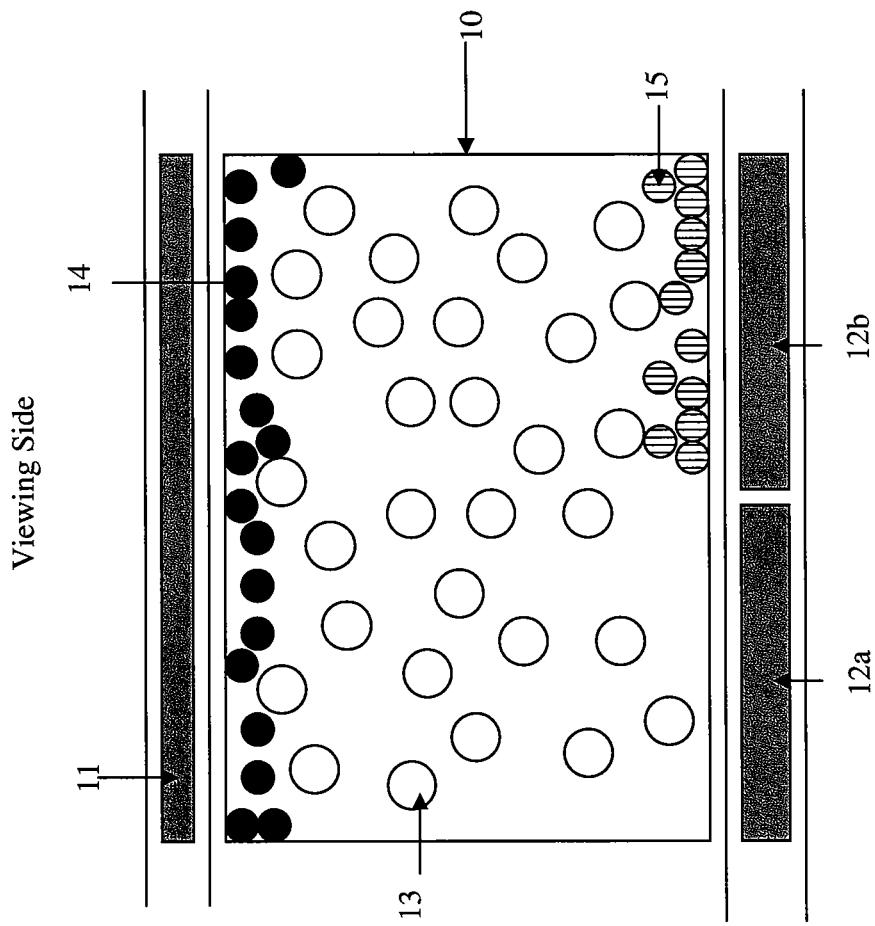
FIGS. 1a-1c depict how an electrophoretic display utilizing an electrophoretic display fluid of the present invention display different color states.

The present invention is directed to an electrophoretic fluid which comprises a non-mobile or semi-mobile phase and two types of charged pigment particles dispersed in a solvent or solvent mixture.

The non-mobile or semi-mobile phase is, by definition, far less responsive to the applied electric field than the two types of charged pigment particles in the display fluid. The non-mobile or semi-mobile phase may even be fixed in location and does not move at all. The key defining part of the non-mobile or semi-mobile phase is that, with an applied electric field, the two types of charged pigment particles would move through the interstitial spaces in the non-mobile or semi-mobile phase to cause the two types of charged pigment particles to be either on top of the non-mobile or semi-mobile phase or underneath the non-mobile or semi-mobile phase.

It is preferred that the non-mobile or semi-mobile phase is of the white color. The non-mobile or semi-mobile phase is uncharged or has a lower charge potential (for example, with a zeta potential of less than 10, preferably less than 20).

In one embodiment, the non-mobile or semi-mobile phase may be non-mobile or semi-mobile pigment particles formed from an inorganic, organic or polymeric material. To achieve a high light scattering, pigments of a high refractive index are particularly useful. Suitable white non-mobile or semi-mobile pigment particles may be formed from $TiO_2$, $BaSO_4$, ZnO or the like.

In another embodiment of the present invention, the non-mobile or semi-mobile phase may be formed by dispersing droplets of a non-polar solvent in a polar solvent. A matrix of such droplets is called a "reverse emulsion" and is described in detail in US Patent Publication No. 2010/0033802 by Roh.

The non-polar solvents may include $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{2-30}$ esters, $C_{3-30}$ thioesters, terpenes, $C_{2-30}$ organosilanes, $C_{2-30}$ organosiloxanes and the like. Such non-polar solvents may be used alone or in combination.

The polar solvent may include alcohols, amines, amides, ketones, carboxylic acids and salts thereof, glycols, polyethers, sulfides, sulfonic acids and salts thereof, sulfates, phosphides, phosphites, phosphonites, phosphinites, phosphates, phosphonates, phosphinates, imides, nitriles, isonitriles, amidines, nitro compounds, nitroso compounds, sulfoxides, sulfonates, thiols, water and the like. Such polar solvents may be used alone or in combination.

Alternatively, air bubbles may be used to replace the pigment-based non-mobile or semi-mobile particles.

In a further embodiment, the non-mobile or semi-mobile phase may comprise a solid porous matrix in which the two types of charged pigment particles dispersed in a solvent or solvent mixture may move through, towards the electrodes.

One type of the charged pigment particles, in the context of the present invention, is solid particles and may be non-transparent. They are preferably of the black color. Suitable materials may include inorganic, organic or polymeric black particles. Such black pigment particles may be formed from materials such as manganese ferrite black spinel, copper chromite black spinel, carbon black, zinc sulfide, stained black polymer or other color absorbing materials.

The second type of the charged pigment particles is transparent or opaque colored particles such as transparent or opaque red, green or blue pigment particles. They carry a charge polarity opposite that of the black pigment particles.

The charged pigment particles may also be encapsulated pigment particles.

Opaque or transparent colored pigment particles may have chemically bonded charges or may acquire charges in the dispersion through the use of charge additives.

Materials for the opaque or transparent colored pigment particles may include, but are not limited to, commercially available color pigments used in the LCD industry for color filter applications, such as Clariant's Hostaperm Red D2B-COF VP 3781 (i.e., red pigment 254) which is in the class of diketopyrrolopyrrole, Hostaperm Blue E3R-COF VP3573 (i.e., blue pigment 15:6) which is in the class of phthalocyanine, or Hostaperm Violet RL-COF O2 VP3101 (i.e., violet pigment 23) which is in the class of dioxazine; dyed polymeric microparticles supplied by Merck Chemicals Ltd.; dyed polystyrene particles supplied by Spherotech Inc. or the like.

In one embodiment, the colored particles are transparent. The transparent colored particles may be achieved by a variety of techniques. For example, the transparent colored particles may be prepared by using a colored pigment to form the particles and the colored pigment has a refractive index closely matched to that of the solvent in which the colored particles are dispersed. Table 1 shows the refractive indexes of a few commonly used pigments and solvents.

TABLE 1

| Material | Refractive Index |
|---|---|
| Air | 1 |
| Water | 1.33 |
| Glass, soda lime | 1.51 |
| Isopar-G | 1.42 |
| Silicone oil | 1.52 |
| PMMA | 1.49 |
| Polyethylene | 1.51 |
| Polystyrene | 1.59 |
| Indigo (blue) | 1.49-1.52 |
| Smalt (blue) | 1.49-1.52 |
| Ultramarine (lazurite, blue) | 1.5 |
| Verdigris (basic copper acetate, green) | 1.53-1.56 |
| Gamboge (organic resin, green) | 1.58-1.59 |
| Siderite (red) | 1.57-1.78 |

Alternatively, polymeric beads may be stained with a dye to obtain transparent colored particles or a dye may be dissolved into monomers that can be polymerized into the polymeric beads.

Typical polymeric materials used for creating micro-beads may include, but are not limited to, polyethylene, polymethyl methacrylate (acrylic) or polystyrene. The refractive index of the polymer beads are preferably closely matched to that of the solvent or solvent mixture in which the colored particles are dispersed. When the transparent colored particles are formed from this technique, the particles are not limited to a certain size range. For example, the diameter of the transparent colored particles may be greater than 100 µm.

Examples of this type of transparent colored particles may include, but are not limited to, dyed polymeric microparticles supplied by Merck Chemicals Ltd.; dyed polystyrene particles supplied by Spherotech Inc. or the like. For the transparent colored particles formed form polymeric beads, the dye soluble therein is much more dilute and adjustable. For example, the concentration of the red dye in the red particles may be adjusted to allow only the blue or green colors to be absorbed and the red color to pass through. With a white background to reflect the red color, the red color brightness can be maximized.

The two types of charged pigment particles may exhibit a native charge, or may be charged explicitly using a charge control agent, or may acquire a charge when suspended in the solvent or solvent mixture.

Suitable charge control agents are well known in the art; they may be polymeric or non-polymeric in nature or may be ionic or non-ionic.

The ionic surfactants may include (a) the anionic type: alkane carboxylic salts, alkane sulfonic salts, such as Aerosol OT, alkyl-aromatic sulfonic salts, such as sodium dodecylbenzenesulfonate, isopropylamine, alkyl benzene sulfonate, phosphates, phosphoric salts or the like, and (b) the cationic type: fatty amine salts, quaternary ammonium salts, alkyl pyridinium salts or the like.

The non-ionic surfactants may include sorbitan monoesters, polyethoxylated nonionics, polybutene succinimide, maleic anhydride copolymers, vinylpyridine copolymers, vinylpyrrolidone copolymer (such as Ganex™ from International Specialty Products), (meth)acrylic acid copolymers, N,N-dimethylaminoethyl (meth)acrylate copolymers and the like.

Fluorosurfactants are particularly useful as charge controlling agents in fluorocarbon solvents. These include FC fluorosurfactants such as FC-170C™, FC-171™, FC-176™, FC430™, FC431™ and FC740™ from 3M Company and Zonyl™ fluorosurfactants such as Zonyl™ FSA, FSE, FSN, FSN-100, FSO, FSO-100, FSD and UR from Dupont.

The non-mobile or semi-mobile phase and the two types of charged pigment particles are dispersed in a solvent or solvent mixture to form a display fluid.

The solvent or solvent mixture in which the particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicone oil, such as DC200 from Dow Corning, aromatic hydrocarbons such as toluene, xylene, phenylxylylethane, dodecylbenzene or alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Delaware. The solvent or solvent mixture is preferably clear and colorless.

If the non-mobile or semi-mobile phase is white pigment particles, such particles are usually larger in diameter than the two types of charged pigment particles. For example, the size (the diameter) of the non-mobile or semi-mobile pigment particles may be in the range of about 0.5 to about 3 microns while the size of the two types of charged pigment particles may be in the range of about 0.01 to about 1 micron.

In addition, the white non-mobile or semi-mobile pigment particles also have a higher concentration than that of each of the two types of the charged pigment particles in the fluid. For example, the concentration of the non-mobile or semi-mobile pigment particles may be in the range of about 10% to about 40% by weight of the fluid while the concentration of each of the two types of charged pigment particles may be in the range of about 1% to about 10% by weight of the fluid.

Figure 1B:
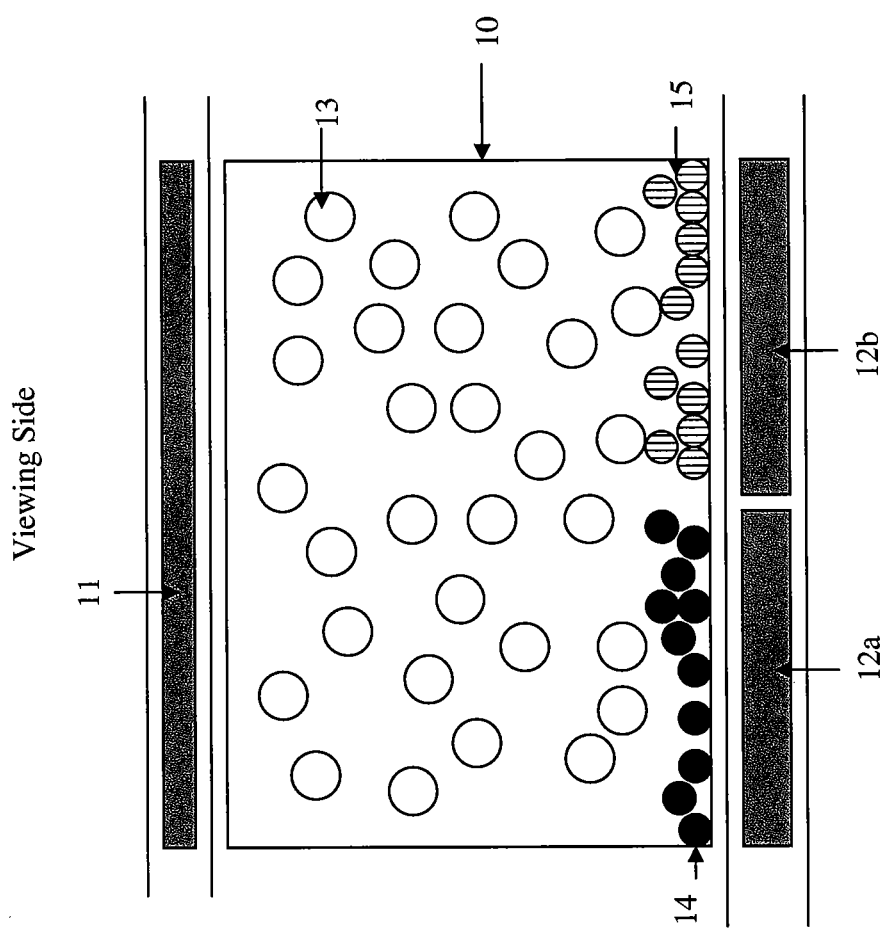
Figure 1C:
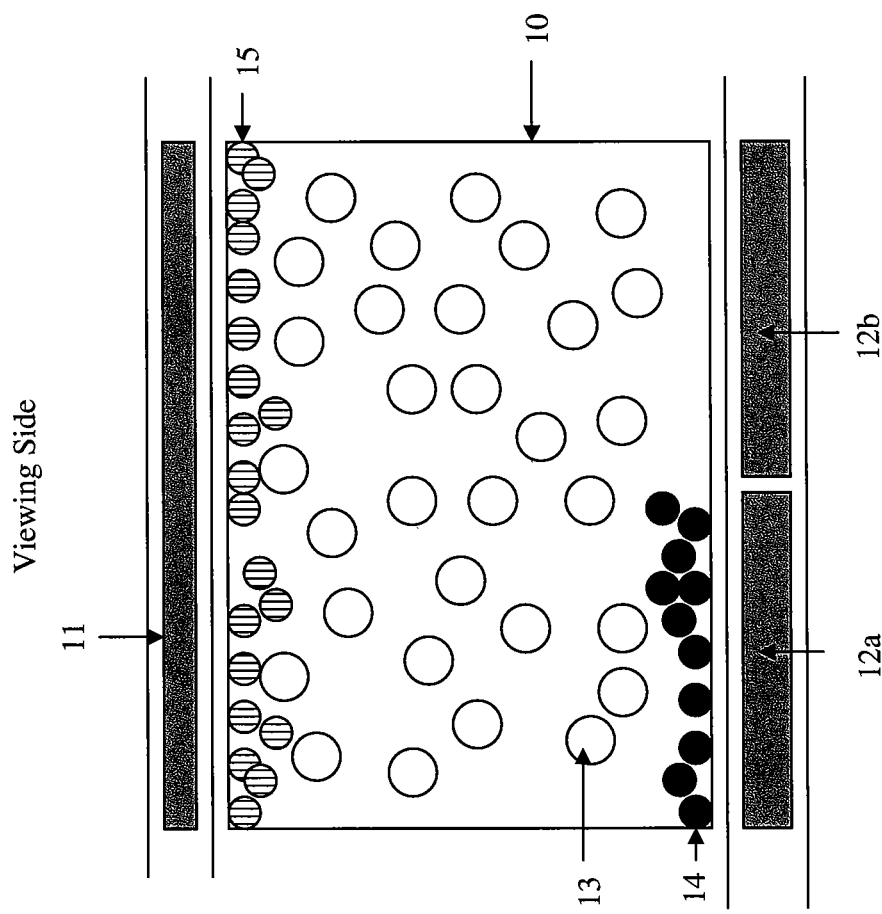

FIGS. 1a-1c depict how a display cell of the present invention may display three different color states when the non-mobile or semi-mobile phase is non-mobile or semi-mobile white particles.

As shown in FIG. 1a, a display cell (10) is sandwiched between a common electrode (11) and pixel electrodes (12a and 12b) and the display cell is filled with an electrophoretic fluid comprising white non-mobile or semi-mobile pigment particles (13), charged black pigment particles (14) and charged red transparent or opaque pigment particles (15) dispersed in a clear and colorless solvent. The black pigment particles and the red transparent or opaque particles are oppositely charged. For example, if the black pigment particles are positively charged, then the transparent or opaque red pigment particles are negatively charged. Accordingly, the two types of charged pigment particles (14 and 15) may move towards the common electrode (11) or the pixel electrodes (12a or 12b), depending on the charge polarity of the particles and the voltage potential difference applied to the common electrode and the pixel electrodes.

In this example, the common electrode is the viewing side.

It is also noted that there may be more than two pixel electrodes associated with a display cell.

The non-mobile or semi-mobile particles (13), as stated above, are pigment particles which are stationary during operation of the display device, and they are substantially uniformly dispersed throughout the electrophoretic fluid in the display cell.

In FIG. 1a, when proper voltages are applied to the common electrode (11) and the two pixel electrodes (12a and 12b), the charged black particles (14) would move to be near or at the common electrode (11) and the oppositely charged red transparent or opaque particles (15) would move to be near or at one of the pixel electrodes (e.g., 12b), causing the black color to be seen at the viewing side.

It is also possible for the voltages to be set to cause the transparent or opaque red particles to move to be at or near both pixel electrodes (12a and 12b), to display the black color.

In FIG. 1b, when proper voltages are applied to the common electrode (11) and the two pixel electrodes (12a and 12b), the charged black particles (14) would move to be near or at one of the pixel electrodes (e.g., 12a) and the oppositely charged red transparent or opaque particles (15) would move to be near or at the other pixel electrode (12b), causing the white color (i.e., the color of the non-mobile or semi-mobile pigment particles) to be seen at the viewing side.

In FIG. 1c, when proper voltages are applied to the common electrode (11) and the two pixel electrodes (12a and 12b), the red transparent or opaque particles (15) would move to be near or at the common electrode (11) and the oppositely charged black particles would move to be near or at one of the pixel electrodes (e.g., 12a), causing the red color to be seen at the viewing side.

In this scenario, the transparent or opaque red particles act as a red filter for the light reflected by the white non-mobile or semi-mobile particles, achieving the red color.

It is also possible for the voltages to be set to cause the black particles to move to be at or near both pixel electrodes (12a and 12b), to display the red color.

The same result can also be achieved if the red particles are opaque and of sufficient density to block most of the incident light, to display the red color state.

Figure 2A:
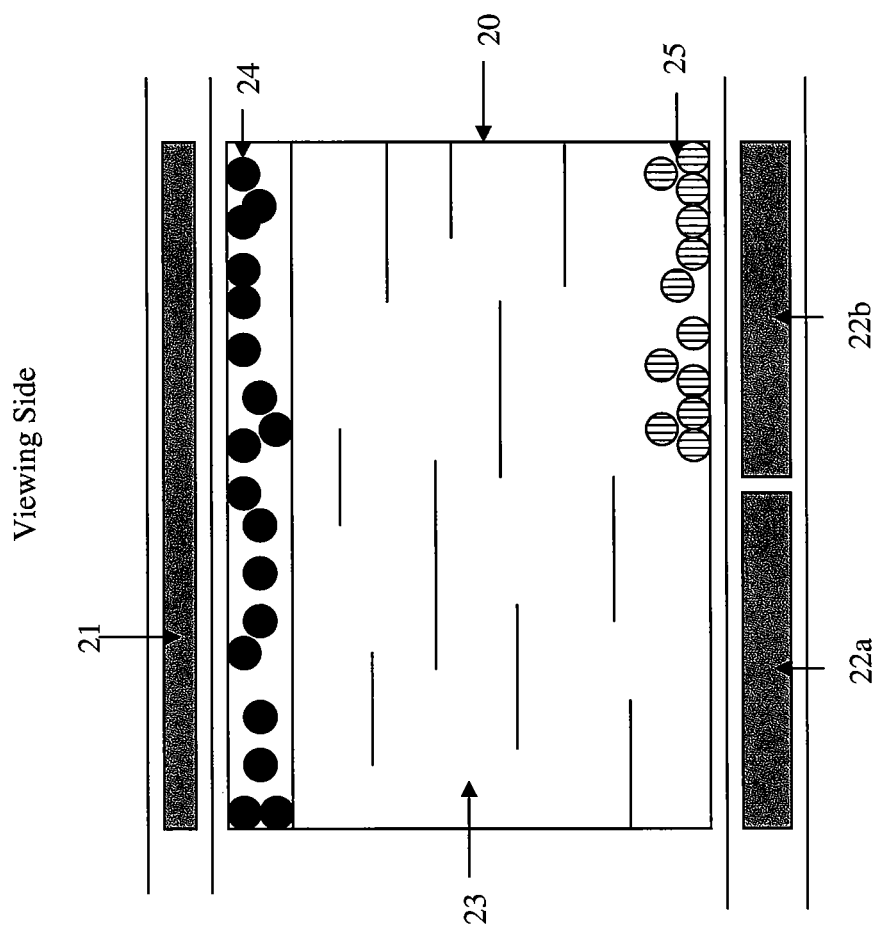
FIGS. 2a-2c depict an alternative embodiment of the present invention.
Figure 2B:
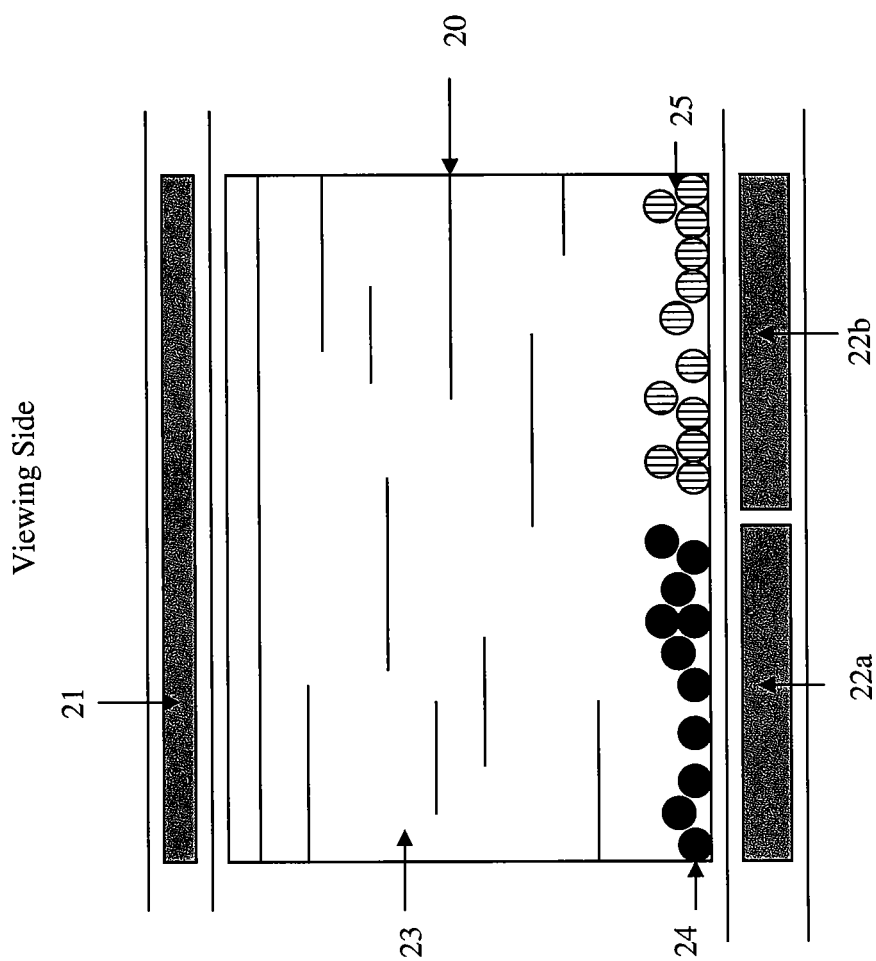
Figure 2C:
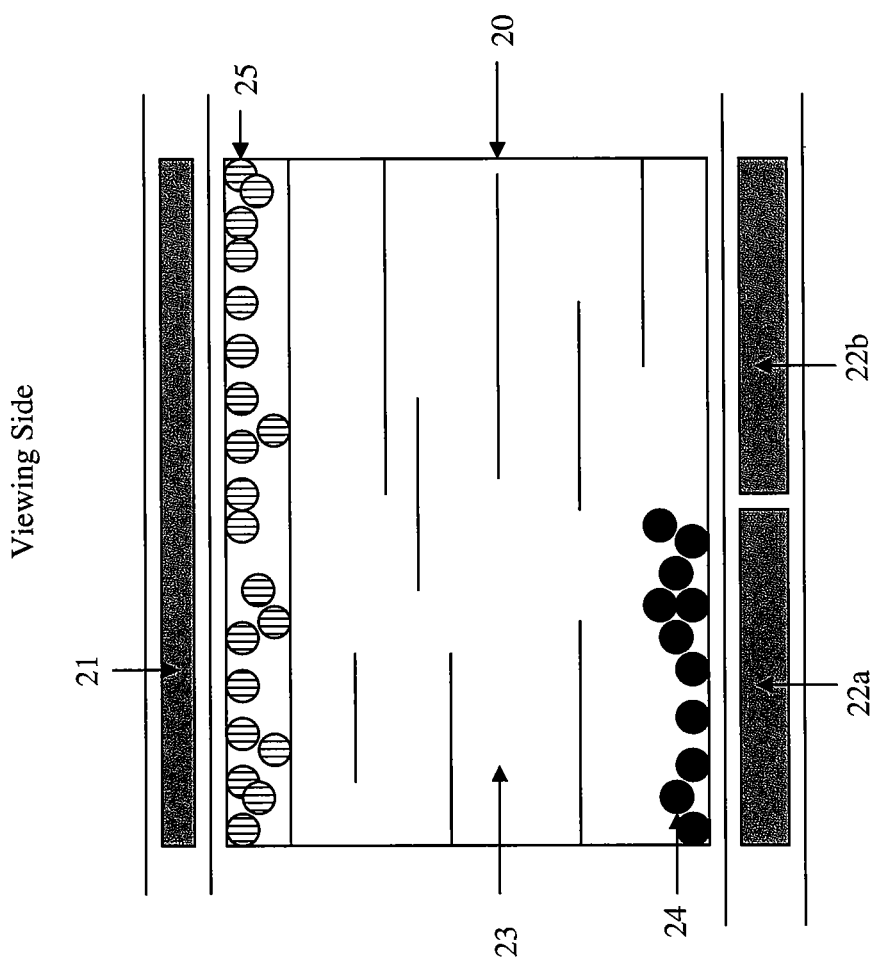

In another embodiment of the present invention, the white non-mobile or semi-mobile phase is a white solid porous matrix (23) as shown in FIGS. 2a-2c. The charged black pigment particles (24) and the red transparent or opaque particles (25) are oppositely charged. As shown, the display cell (20) may display the black color (see FIG. 2a), the white color (see FIG. 2b) or the red color (see FIG. 2c), depending on the voltages applied to the common electrode (21) and the pixel electrodes (22a and 22b). It is also possible for the voltages to be set to cause the transparent or opaque red particles to move to be at or near both pixel electrodes (12a and 12b), to display the black color in FIG. 2a. In FIG. 2c, it is also possible for the voltages to be set to cause the black particles to move to be at or near both pixel electrodes (12a and 12b), to display the red color.

The solid porous matrix in FIGS. 2a-2c is prepared from either a polymeric matrix or a ceramic type filter with microchannels. In the case of a polymeric matrix, two polymeric materials are mixed together in a uniform dispersion. One of them is then cured and the other remains uncured so the uncured one can be washed out by a solvent, leaving microchannels for passage of the two types of charged pigment particles.

In the context of the present invention, the solid porous matrix may also be a thin membrane of regenerated cellulose, cellulose ester or PVDF (polyvinyldifluoride).

The display cells as shown in FIGS. 1 and 2 are ideal for a color display device wherein each pixel consists of three sub pixels, one of which has red transparent or opaque particles, black particles and white non-mobile or semi-mobile phase as shown in FIGS. 1 and 2, another of which has green transparent or opaque particles, black particles and white non-mobile or semi-mobile phase, and a third of which has blue transparent or opaque particles, black particles and white non-mobile or semi-mobile phase.

FIG. 3 illustrates how multiple colors are displayed with a display device comprising the display fluid of the present invention. Each display cell represents a sub-pixel and each pixel has three sub-pixels. The three display cells, each representing a sub-pixel, are filled with display fluids as described above.

In FIG. 3a, when a white pixel is desired, all three sub-pixels are turned to the white color state. In FIG. 3b, when a black pixel is desired, all three sub-pixels are turned to the black state. FIG. 3c, when a red color is desired, one of the sub-pixel is turned to red (i.e., the red transparent or opaque particles move to be near or at the common electrode as shown in FIG. 1c or 2c) and the remaining two sub-pixels are turned to the black state for maximum color saturation. Similarly, FIG. 3d and FIG. 3e display the green and blue colors respectively. Alternatively, in FIGS. 3c, 3d and 3e, one of the sub-pixel is driven to the color state while the remaining two sub-pixels are driven to the white state for maximum brightness (at the expense of the color saturation). Further alternatively, in FIGS. 3c, 3d and 3e, one of the sub-pixel is driven to the color state while the remaining two sub-pixels are driven to the black and white states respectively. Such a full color display can have the same black and white characters of a good black and white display, but also show red, green and blue colors of high quality.

The display cells referred to in the present application may be of a conventional walled or partition type, a microencapsulated type or a microcup type. In the microcup type, the electrophoretic display cells may be sealed with a top sealing layer. There may also be an adhesive layer between the electrophoretic display cells and the common electrode. The term "display cell" is intended to refer to a micro-container which is individually filled with a display fluid. Examples of "display cell" include, but are not limited to, microcups, microcapsules, micro-channels, other partition-typed display cells and equivalents thereof.

While particular forms of the invention have been illustrated and described, it will be apparent that various modifications can be made without departing from the spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A display device comprising a plurality of display cells, wherein each of said display cells is filled with an electrophoretic display fluid, which electrophoretic display fluid
   A. comprises (i) a white non-mobile or semi-mobile phase, (ii) a first type of charged pigment particles which are black, (iii) a second type of charged pigment particles which are colored and transparent or opaque, and (iv) a solvent or solvent mixture; wherein said non-mobile or semi-mobile phase and the two types of charged pigment particles are dispersed in the solvent or solvent mixture, and the two types of charged pigment particles are oppositely charged, and
   B is sandwiched between a common electrode which is on the viewing side and at least two pixel electrodes,
   whereby a black color is displayed when the first type of charged pigment particles is driven to the common electrode, a color of the colored and transparent or opaque charged pigment particles is displayed when the second type of charged pigment particles is driven to the common electrode, and a white color is displayed when the first and the second types of charged pigment particles are driven to separate pixel electrodes.

2. The display device of claim 1, wherein the non-mobile or semi-mobile phase is formed by dispersing droplets of a non-polar solvent in a polar solvent.

3. The display device of claim 1, wherein said non-mobile or semi-mobile phase is a polymeric porous matrix.

4. The display device of claim 1, wherein the colored and transparent or opaque pigment particles are red, green or blue, and the solvent or solvent mixture is clear and colorless.

5. The display device of claim 1, wherein said display cells are microcup-based.

6. The display device of claim 1, wherein said display cells are microcapsule-based.

7. The display device of claim 1, wherein three display cells form a pixel wherein the three display cells are filled with the display fluid comprising red transparent or opaque, green transparent or opaque and blue transparent or opaque pigment particles, respectively.

8. The display device of claim 1, wherein said non-mobile or semi-mobile phase comprises white non-mobile or semi-mobile pigment particles.

9. The display device of claim 8, wherein the concentration of the non-mobile or semi-mobile pigment particles is in the range of about 10% to about 40% of the fluid.

10. The display device of claim 8, wherein the concentration of each of the two types of the charged particles is in the range of about 1% to about 10% of the fluid.

11. The display device of claim 1, wherein the second type of charged pigment particles are transparent colored particles.

12. The display device of claim 11, wherein the transparent colored particles are formed from a pigment which has a refractive index closely matched to that of the solvent or solvent mixture.

13. The display device of claim 11, wherein the transparent colored particles are polymeric beads stained with a dye.

14. The display device of claim 13, wherein the polymeric beads are formed from polyethylene, polymethyl methacrylate (acrylic), or polystyrene.

15. The display device of claim 11, wherein the transparent colored particles are polymeric beads with a dye dissolved therein.

16. The display device of claim 15, wherein the polymeric beads are formed from polyethylene, polymethyl methacrylate (acrylic), or polystyrene.

* * * * *